(12) United States Patent
Raines

(10) Patent No.: US 8,638,203 B2
(45) Date of Patent: Jan. 28, 2014

(54) FIFTH WHEEL ALARM SYSTEM

(75) Inventor: Randall Howard Raines, Nashville, TN (US)

(73) Assignee: Howard Beuter Inc., Nashville, TN (US)

( * ) Notice: Subject to any disclaimer, the term of this patent is extended or adjusted under 35 U.S.C. 154(b) by 136 days.

(21) Appl. No.: 13/100,719

(22) Filed: May 4, 2011

(65) Prior Publication Data

US 2012/0182139 A1 Jul. 19, 2012

Related U.S. Application Data

(60) Provisional application No. 61/461,288, filed on Jan. 18, 2011.

(51) Int. Cl.
*G08B 21/00* (2006.01)

(52) U.S. Cl.
USPC .......................................... 340/431

(58) Field of Classification Search
USPC ......... 200/61.44; 280/432, 455.1, 511, 446.1; 340/52, 282, 429, 431, 432, 440, 340/686.1, 686.2, 687
See application file for complete search history.

(56) References Cited

U.S. PATENT DOCUMENTS

| | | | |
|---|---|---|---|
| 2,454,626 A | 11/1948 | Borzell | |
| 2,927,310 A | 3/1960 | Knapp | |
| 3,588,809 A | 6/1971 | Devlin | |
| 4,040,006 A * | 8/1977 | Kimmel | ........................ 340/431 |
| 4,119,330 A | 10/1978 | Capps | |
| 4,164,737 A | 8/1979 | Hunter | |
| 4,271,401 A | 6/1981 | Meo | |
| 4,341,395 A | 7/1982 | Miller et al. | |
| 4,585,248 A | 4/1986 | Miller et al. | |
| 4,700,966 A | 10/1987 | Hawkins et al. | |
| 4,784,403 A | 11/1988 | Hawkins et al. | |
| 4,934,727 A | 6/1990 | Hawkins et al. | |
| 5,152,544 A | 10/1992 | Dierker, Jr. et al. | |
| 5,159,312 A | 10/1992 | Engle | |
| 5,456,483 A | 10/1995 | Madsen et al. | |
| 5,558,350 A | 9/1996 | Kimbrough et al. | |
| 5,558,351 A | 9/1996 | Hunter | |
| 5,579,228 A | 11/1996 | Kimbrough et al. | |
| 5,675,309 A * | 10/1997 | DeVolpi | ........................... 338/68 |
| 5,678,505 A | 10/1997 | Leung et al. | |
| 5,912,616 A | 6/1999 | Valentino | |
| 6,268,800 B1 | 7/2001 | Howard | |
| 6,714,124 B2 * | 3/2004 | Meyer | ........................... 340/431 |
| 6,746,035 B1 | 6/2004 | Williams et al. | |

(Continued)

*Primary Examiner* — Brian Zimmerman
*Assistant Examiner* — Thomas McCormack
(74) *Attorney, Agent, or Firm* — Harness, Dickey & Pierce, P.L.C.

(57) ABSTRACT

An alarm system for an articulated vehicle includes a first part adapted to attach to a vehicular hitch member, and a second part adapted to attach to a trailering hitch member. The first part includes a conductive post extending vertically between first and second electrical contacts. The post and the first and second electrical contacts form parts of an alarm circuit. The second part includes first and a second arms horizontally extending towards the post in a common plane at an angle with respect to each other. When attached, the first and second parts are disposed so that the first arm moves the post into contact with the first electrical contact as the articulated vehicle turns in a first direction, and so that the second arm moves the post into contact with the second electrical contact as the articulated vehicle turns in a second direction opposite the first direction.

16 Claims, 10 Drawing Sheets

(56) References Cited

U.S. PATENT DOCUMENTS

| | | | |
|---|---|---|---|
| 6,926,363 B2 * | 8/2005 | Yamashita | 297/366 |
| 6,956,468 B2 | 10/2005 | Lee et al. | |
| 7,195,271 B2 | 3/2007 | Howell et al. | |
| 7,621,552 B2 | 11/2009 | Bergum et al. | |
| 7,703,790 B2 | 4/2010 | Cunefare et al. | |
| 7,715,953 B2 | 5/2010 | Shepard | |
| 2006/0087413 A1 * | 4/2006 | Lee | 340/431 |
| 2009/0045603 A1 * | 2/2009 | Huntimer | 280/455.1 |

* cited by examiner

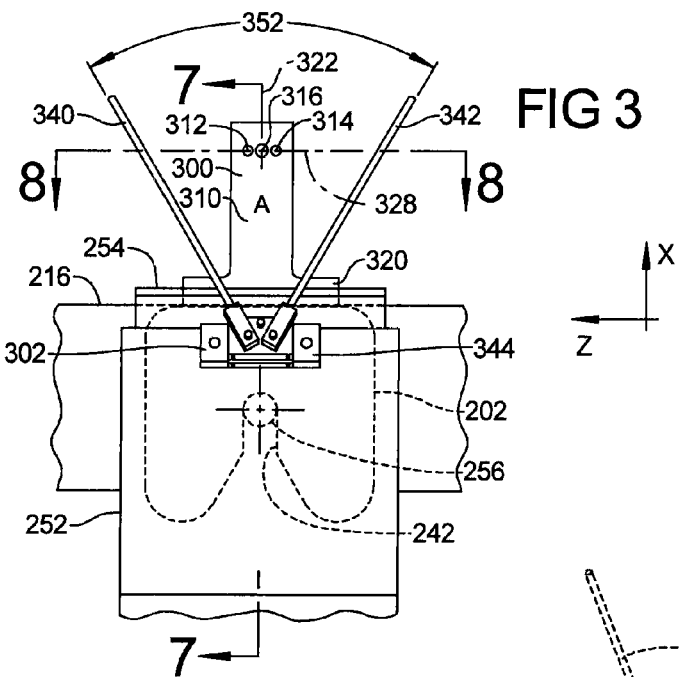
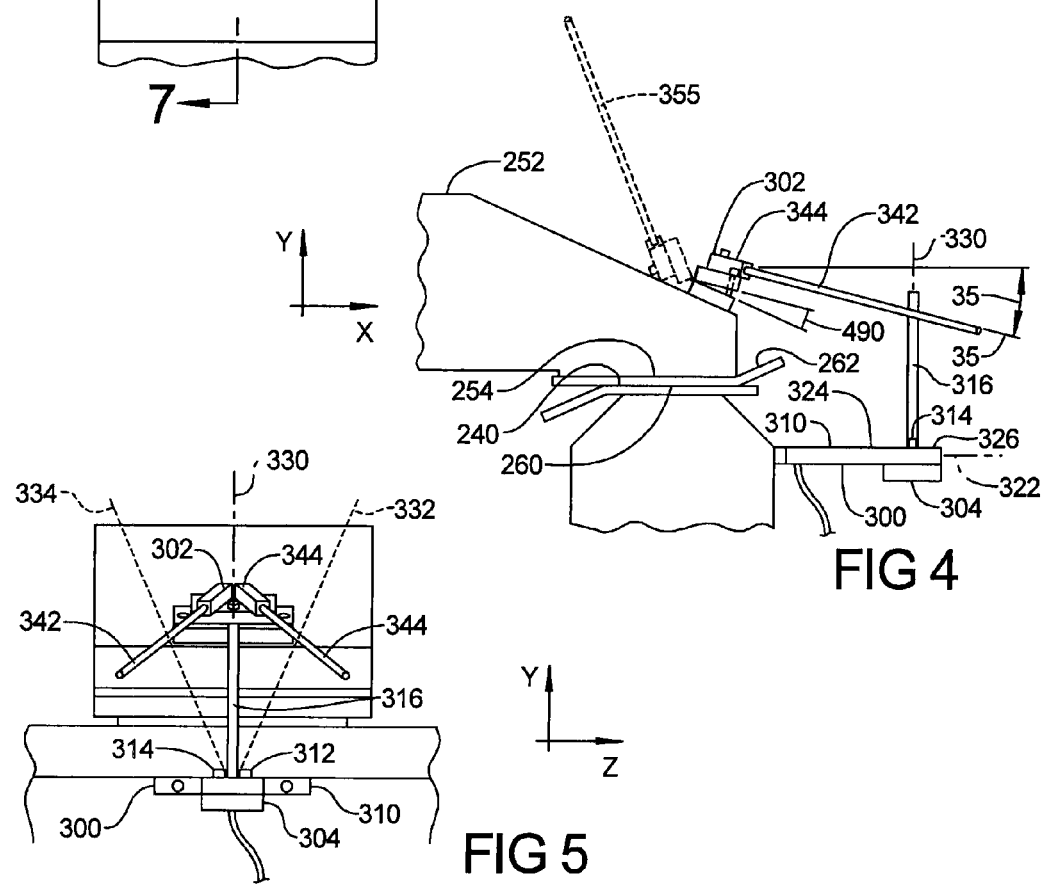

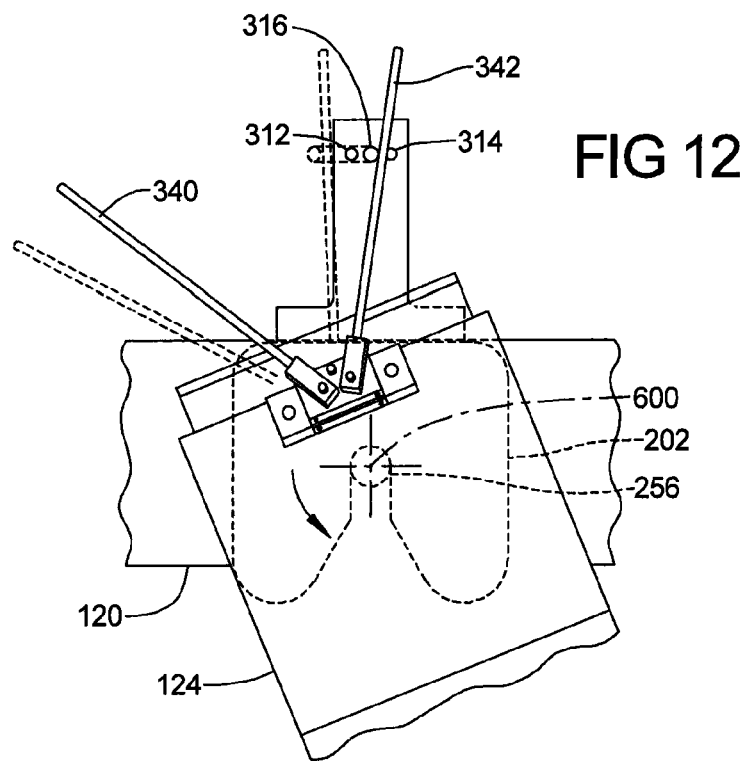
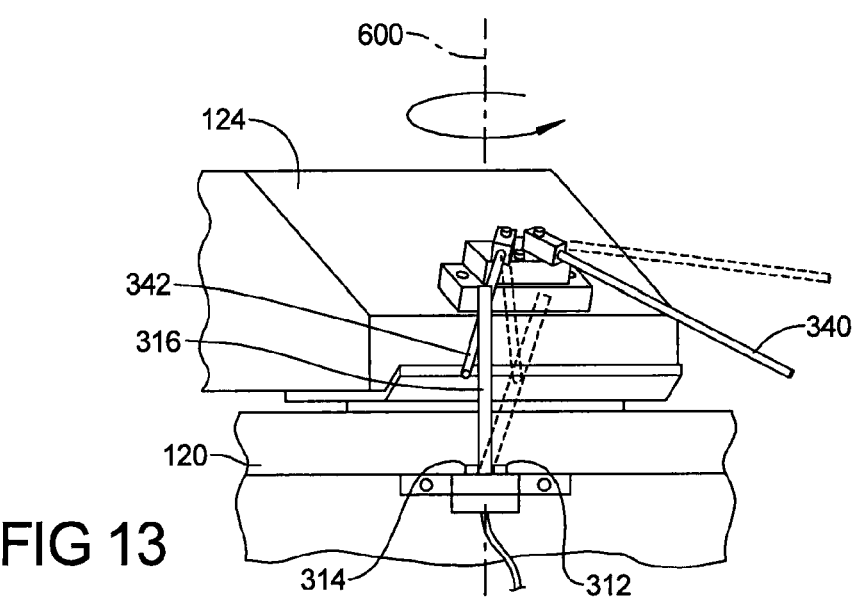

FIFTH WHEEL ALARM SYSTEM

CROSS-REFERENCE TO RELATED APPLICATIONS

This application claims the benefit of U.S. Provisional Application No. 61/461,288, filed on Jan. 18, 2011. The entire disclosure of the Provisional application is incorporated herein by reference.

FIELD

The present disclosure relates to alarm systems for articulated vehicles and, more particularly, to jackknife warning systems.

BACKGROUND AND SUMMARY

Automotive vehicles are widely used to tow trailers such as vehicle trailers and recreational vehicles. Trailers typically use a trailer hitch that connects a trailer to a passenger car or truck as a tow vehicle. Trailer hitches include a tow ball that is installed on the tow vehicle and a draw bar that is integral to the trailer. The draw bar includes a socket that is received on and rotates against the tow ball, thereby allowing relative motion between the trailer and the tow vehicle during forward and reverse turning maneuvers.

Some recreational vehicles use a fifth wheel hitch that connects a recreational vehicle with a pickup truck as a tow vehicle. Fifth wheel hitches include a horseshoe-shaped member that is typically installed in a bed of the pickup truck and a tongue that is installed on the recreational vehicle. The tongue includes a coupling pin that is received within a slot defined by the horseshoe-shaped member. The tongue rotates against a horizontal surface of the horseshoe-shaped member, thereby allowing relative motion between the pickup truck and the recreational vehicle during forward and reverse turning maneuvers.

Negotiating a tow vehicle when coupled to a trailer can be particularly difficult, especially in reverse turning maneuvers, and can give rise to a particular problem commonly referred to as a jackknife situation. Jackknife situations arise when the tow vehicle is turned too sharply and a forward portion of the trailer collides with a rear portion of the tow vehicle. Collisions can cause significant damage to the tow vehicle and the trailer and may jar the two, presenting a hazardous situation.

Warning systems have been developed to warn a driver of an impending jackknife situation. However, jackknife warning systems developed for passenger cars and trucks as tow vehicles are typically designed for use with tow hitches and, therefore, are not easily adapted to fifth wheel hitches. Jackknife warning systems have been developed for use with fifth wheel hitches, however, these jackknife warning systems are typically designed for commercial truck and trailer combinations and, therefore, are not easily adapted to pickup truck and recreational vehicle combinations. Accordingly, there is a need to provide a jackknife warning system for fifth wheel hitches designed for use with pickup trucks and recreational vehicle combinations.

In accordance with the present invention, an alarm system for an articulated vehicle is provided. In one aspect, the alarm system includes a conductive post that extends vertically between two electrical contacts and a pair of arms that extend horizontally towards the post. The arms are disposed to move the post into contact with the electrical contacts when the articulated vehicle is turned at a radius that is too sharp, completing an alarm circuit and triggering an alarm. Additional aspects employ a mounting member that allows a first angle between the arms and a second angle of the arms with respect to a horizontal plane to be adjusted. In further aspects, the mounting member allows the arms to move together between a first position in which the arms extend towards the post and a second position in which the arms extend away from the post.

The present alarm system is advantageous over other alarm systems. For example, the alarm system is advantageously simple in construction and can be readily installed to a variety of commercially-available vehicle hitches, including fifth wheel hitches. The alarm system also advantageously allows the driver to set an alarm to trigger at his or her preference, and to position parts of the alarm system out of the way when hitching and unhitching. Additional advantages and features of the present invention will be found in the following description and accompanying claims, as well as in the appended drawings.

BRIEF DESCRIPTION OF DRAWINGS

FIG. 3 is a top elevation view illustrating the alarm system shown in FIG. 2;

FIG. 4 is a side elevation view illustrating the alarm system shown in FIG. 2;

FIG. 5 is a front elevation view illustrating the alarm system shown in FIG. 2;

FIG. 12 is a top elevation view illustrating operation of the alarm system according to the present teachings; and FIG. 13 is a front elevation view illustrating operation of an alarm system according to the present teachings.

Corresponding reference numerals indicate corresponding parts throughout the several views of the drawings.

DETAILED DESCRIPTION

Figure 1:
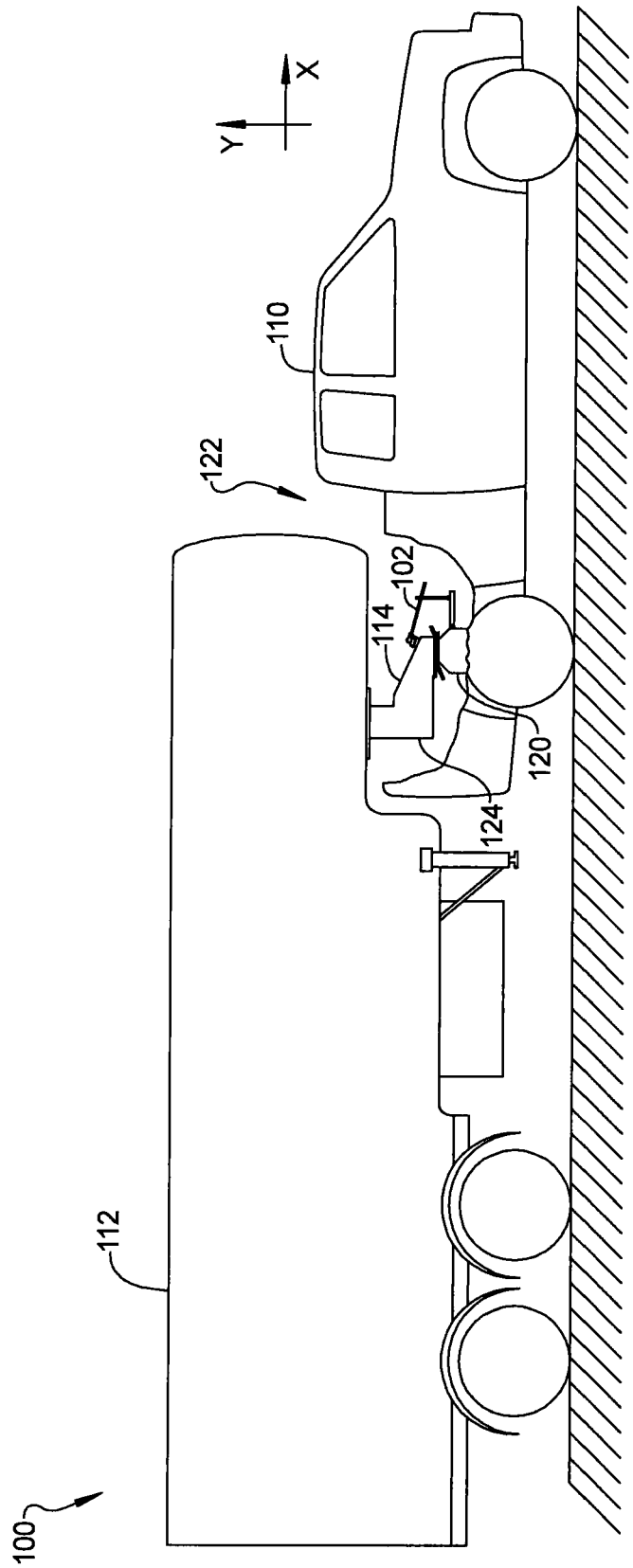
FIG. 1 is a fragmentary side view illustrating an articulated vehicle including an exemplary alarm system according to the present teachings.
Figure 2:
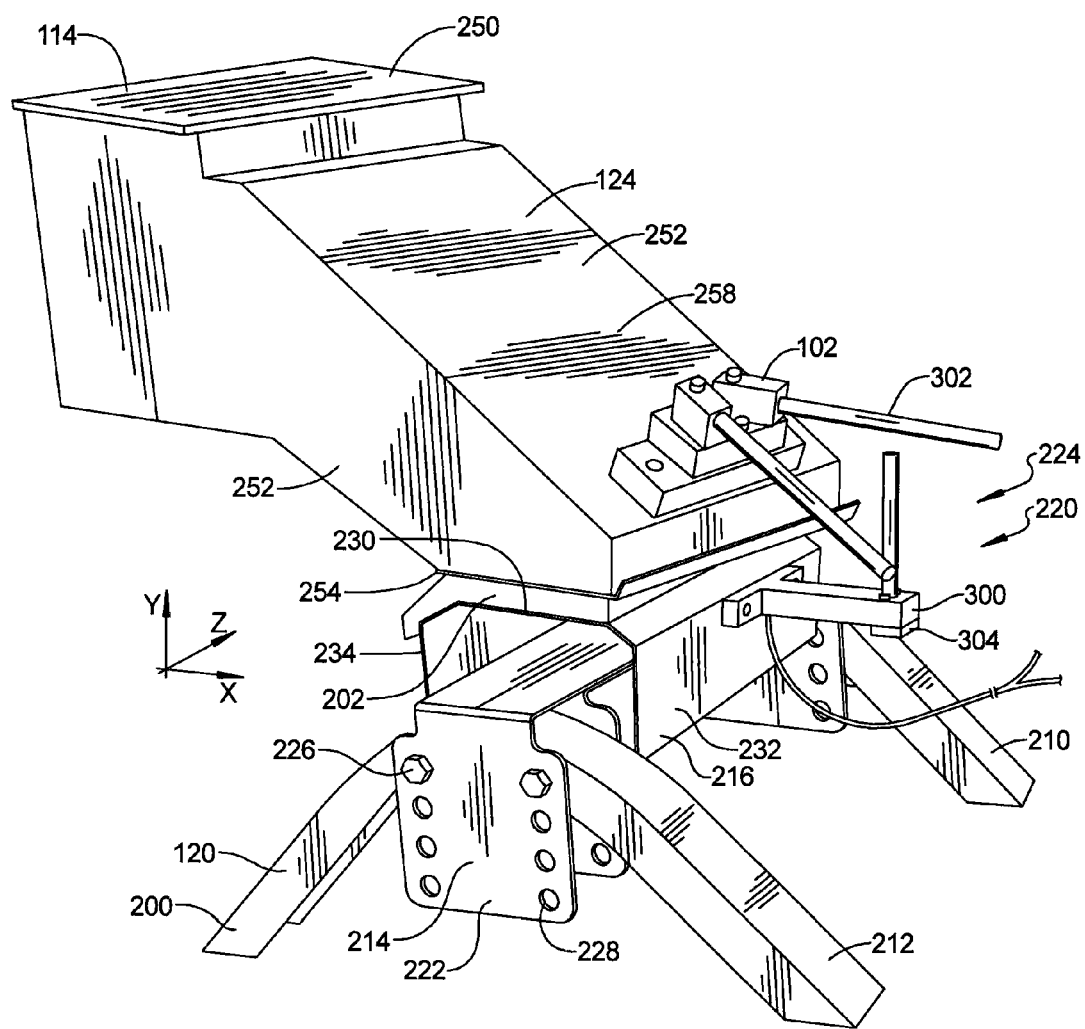
FIG. 2 is a perspective view illustrating an exemplary alarm system coupled to a fifth wheel hitch according to the present teachings.

The present disclosure provides an alarm system that installs to a fifth wheel hitch and an associated tow vehicle such as a passenger truck. The alarm system warns a driver of the tow vehicle when the tow vehicle and a trailer in tow are in close proximity and about to collide. The alarm system can prevent an impending jackknife situation by alerting the driver in time for the driver to take corrective action.

The alarm system is designed for use on a fifth wheel and its tow vehicle while backing up simultaneously. The alarm system is an audible alarm that warns the driver that the two are in close contact and about to collide with each other. The alarm is wired to the back up lights of the tow vehicle. The alarm includes a first part ("Part A") and a second part ("Part B"). Part A attaches to a hitch on the tow vehicle (e.g., a truck). Part B attaches to a king pin box (e.g., a tongue) on the fifth wheel (e.g., a recreational vehicle). Part A has a vertical rod with two contact points on each side of the rod that are connected to a 120 decibel (120 db) siren. Part B has two horizontal rods that are adjustable by the driver to his/her preference. When the king pin box is attached to the hitch, the vertical rod of Part A slides in between the two horizontal rods of Part B. While the two vehicles are backing up as the driver turns one way or the other, the rods become closer to each other. When and if the driver turns at a radius too sharp, the rods then make contact with each other as they trigger the contacts which in turn sets off the audible alarm that warns the driver to stop before any damage is incurred.

In various embodiments, the alarm system includes a first part that rigidly attaches to a first fifth wheel hitch member attached to the tow vehicle and a second part that rigidly attaches to a second fifth wheel hitch member attached to the trailer. The alarm system further includes an alarm that is powered by an alarm circuit. The first part includes a vertically-extending post disposed between two electrical contacts. The second part includes two horizontally-extending arms disposed on opposite sides of the post in a first position. The post and the arms move with the tow vehicle and the trailer, respectively. When the driver turns at a radius that is too sharp, one of the arms engages the post and moves the post into contact with one of the electrical contacts, completing the alarm circuit and triggering the alarm.

In various features, the alarm system enables the driver to adjust the points at which the arms come into contact with the post. In this way, the alarm system enables the driver to set the alarm to trigger at his or her preference. In other features, the arms are pivotally mounted on the second fifth wheel hitch member and can be moved from the first position where the arms are set to engage the post to a second position where the arms extend away from the post. The second position enables the arms to be positioned out of the way when hitching and unhitching the trailer.

In still further features, the alarm system includes a post attachment that attaches to the post. The post attachment extends vertically from the post and provides a visual cue to the driver as to the location of the horseshoe-shaped member. The post attachment assists the driver to align the horseshoe-shaped member and the coupling pin of the tongue when hitching the trailer to the tow vehicle.

The alarm system can be readily installed to a variety of hitches, including fifth wheel hitches commercially available for use with passenger trucks as tow vehicles. For example, the alarm system can be installed to various fifth wheel hitches available from Reese such as the Pro™ Series fifth wheel hitches. As another example, the fifth wheel alarm system can be installed to various fifth wheel couplings commercially available from B&W Trailer Hitches of Humboldt, Kans. such as the Companion™ fifth wheel hitch and the Patriot™ fifth wheel hitch.

The alarm system according to the present teachings is simple in construction and provides several advantages over other conventional alarm systems. For example, the alarm system can be installed with little modification to the commercially-available fifth wheel hitches. The alarm system also advantageously provides a driver with the ability to adjust points at which the tow vehicle and trailer trigger the alarm. The alarm system further advantageously allows the driver to move the second part attached to the trailer out of the way during hitching and unhitching and storage of the trailer to avoid causing inadvertent damage to the second part. Still further, the alarm system provides a visual cue that assists the driver to align the hitch when negotiating the tow vehicle to hitch the trailer.

With particular reference to FIG. 1, an exemplary articulated vehicle 100 including an alarm system 102 according to the present teachings is presented. Vehicle 100 includes a pickup truck as a tow vehicle 110, a recreational vehicle as a trailer 112, and a fifth wheel hitch 114 that couples tow vehicle 110 and trailer 112. Fifth wheel hitch 114 includes a first hitch member 120 installed within a bed 122 of tow vehicle 110 and a second hitch member 124 installed to trailer 112. When coupled, first hitch 120 rotates against second hitch 124.

With additional reference to FIGS. 1-5, an exemplary fifth wheel hitch 114 is presented. For reference, an x-axis, a y-axis, and a z-axis are shown. The x-axis extends in a longitudinal direction with respect to tow vehicle 110 and points towards a front of tow vehicle 110. The y-axis extends in a vertical direction with respect to tow vehicle 110 and points upward. The z-axis extends in a transverse direction with respect to tow vehicle 110 and points towards a left side of tow vehicle 110.

First hitch 120 includes a support 200 and a head 202. Support 200 is mounted to bed 122 and supports head 202 at a desired height above a floor of bed 122. Support 200 includes legs 210, 212, a rail 214, and a platform 216. Legs 210, 212 attach to bed 122 via rails (not shown) and a bolted connection (not shown). Rail 214 extends between legs 210, 212 and includes ends 220, 222 that attach to legs 210, 212 via bolted connections 224, 226. Each of ends 220, 222 includes apertures 228 arranged in vertical direction that enable the height of head 202 to be adjusted. Platform 216 attaches to rail 214 and can be fixed at various positions along rail 214 in the transverse direction (z-direction). Platform 216 is formed from sheet or plate metal and includes a top wall 230 disposed above rail 214 and side walls 232, 234 disposed on fore and aft sides of rail 214, respectively. Head 202 is attached to platform 216 at top wall 230 and includes a bearing surface 240 and a slot 242.

Second hitch 124 includes a mounting flange 250, an extension box 252, a bearing plate 254, and a coupling pin 256. Mounting flange 250 attaches to an underside of trailer 112 via a bolted connection (not shown). Extension box 252 extends between and connects mounting flange 250 and bearing plate 254. Extension box 252 is a generally hollow construction formed of sheet or plate metal and includes a side wall 258 that slopes downward from mounting flange 250 towards bearing plate 254. Bearing plate 254 is a generally flat construction formed of plate metal and includes a bearing surface 260 complementary to bearing surface 240 and a lead portion 262. Bearing surface 260 rotates against bearing surface 240 when coupled. Lead portion 262 is configured to ride up on head member 202 when hitching trailer 112 with tow vehicle 110. Coupling pin 256 is disposed on bearing surface 240 and extends from bearing plate 254. When coupled, coupling pin 256 is releaseably retained within slot 242 of head member 202.

Alarm system 102 includes a first part 300, a second part 302, and an alarm 304. Generally, first part 300 is attached to first hitch member 120 and moves with tow vehicle 110. Second part 302 is attached to second hitch member 124 and moves with trailer 112. Alarm 304 is an audible alarm attached to first part 300, and is powered by tow vehicle 110 via an alarm circuit as described in more detail below. While alarm 304 is presented as an audible alarm in a preferred embodiment, alarm 304 may be any other suitable alarm for alerting the driver. Accordingly, in various embodiments, alarm 304 is a visual alarm such as a light suitably positioned on trailer 112 and/or tow vehicle 110, for example, in an instrument panel, overhead console, or other passenger compartment area.

First part 300 includes a first mounting member 310, a first electrical contact 312, a second electrical contact 314, and a conductive post 316. Mounting member 310 is attached to a side wall 232 of platform 216 at a first end 320 and extends towards the front of tow vehicle 110 along an axis 322 substantially parallel to the longitudinal axis (x-axis). Mounting member 310 can be attached to platform 216 using various fasteners and fastening methods. Electrical contacts 312, 314 are supported on a top surface 324 of mounting member 310 at a second end 326 opposite first end 320, and are connected in parallel to alarm circuit. Electrical contacts 312, 314 protrude vertically from top surface 324 and are spaced apart along an axis 328 extending in the transverse direction (z-axis).

Post 316 is supported on top surface 324 between electrical contacts 312, 314, and is connected in series to the alarm circuit. Post 316 extends from top surface 324 and is biased in a first position along an axis 330 extending in the vertical direction (y-axis). Post 316 is movable by second part 302 from the first position to a second position designated at 332, and from the first position to a third position designated at 334. In the second position, post 316 contacts electrical contact 312 and completes the alarm circuit, triggering alarm 304. In the third position, post 316 contacts electrical contact 314 and completes the alarm circuit, triggering alarm 304.

Second part 302 includes a first arm 340, a second arm 342, and a second mounting member 344. Arms 340, 342 are substantially identical and have an elongated cylindrical shape. Mounting member 344 is attached to side wall 258 of extension box 252. Mounting member 344 can be attached to extension box 252 using various fasteners and fastening methods. Mounting member 344 is configured to support arms 340, 342 within a common plane 350 at an angle 352 with respect to each other. Mounting member 344 is further configured to allow angle 352 between arms 340, 342 to be adjusted. Mounting member 344 is further configured to allow an angle 354 at which arms 340, 342 extend in the longitudinal direction with respect to a horizontal plane to be adjusted.

Mounting member 344 is also configured to allow arms 340, 342 to be rotated or moved together between a first position and a second position. FIGS. 3-5 generally depict mounting member 344, arm 340, and arm 342 in the first position. FIG. 4 depicts mounting member 344, arm 340, and arm 342 in the second position in phantom as designated by reference numeral 355. In the first position, arms 340, 342 extend from mounting member 344 in a forward direction towards post 316. In the first position, arms 340, 342 are disposed to engage post 316 as tow vehicle 110 is turned and rotates relative to trailer 112. In the second position, arms 340, 342 extend from mounting member 344 in a rearward direction away from post 316.

Figure 6:
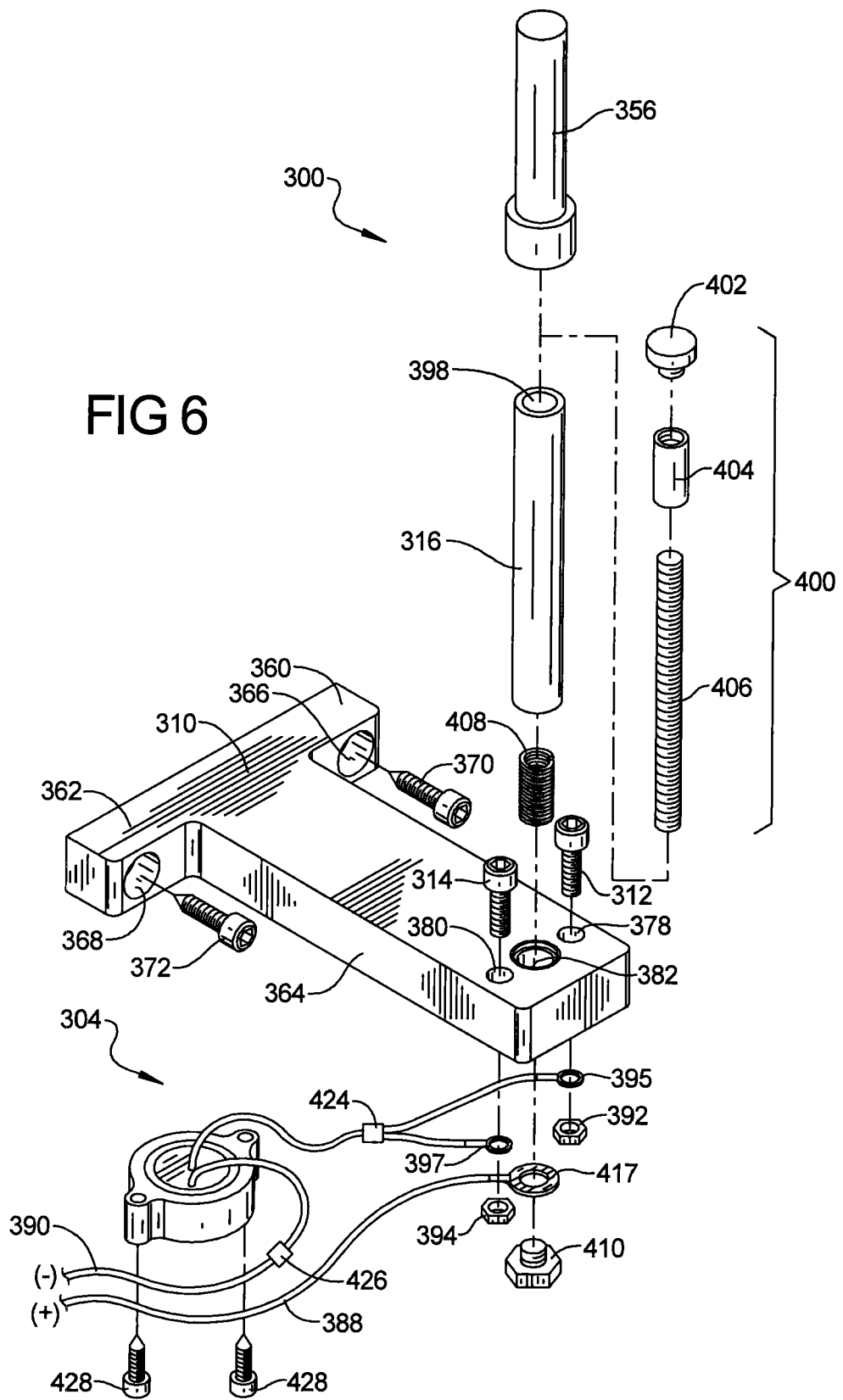
FIG. 6 is a partially exploded perspective view illustrating an exemplary first part of an alarm system according to the present teachings.
Figure 7:
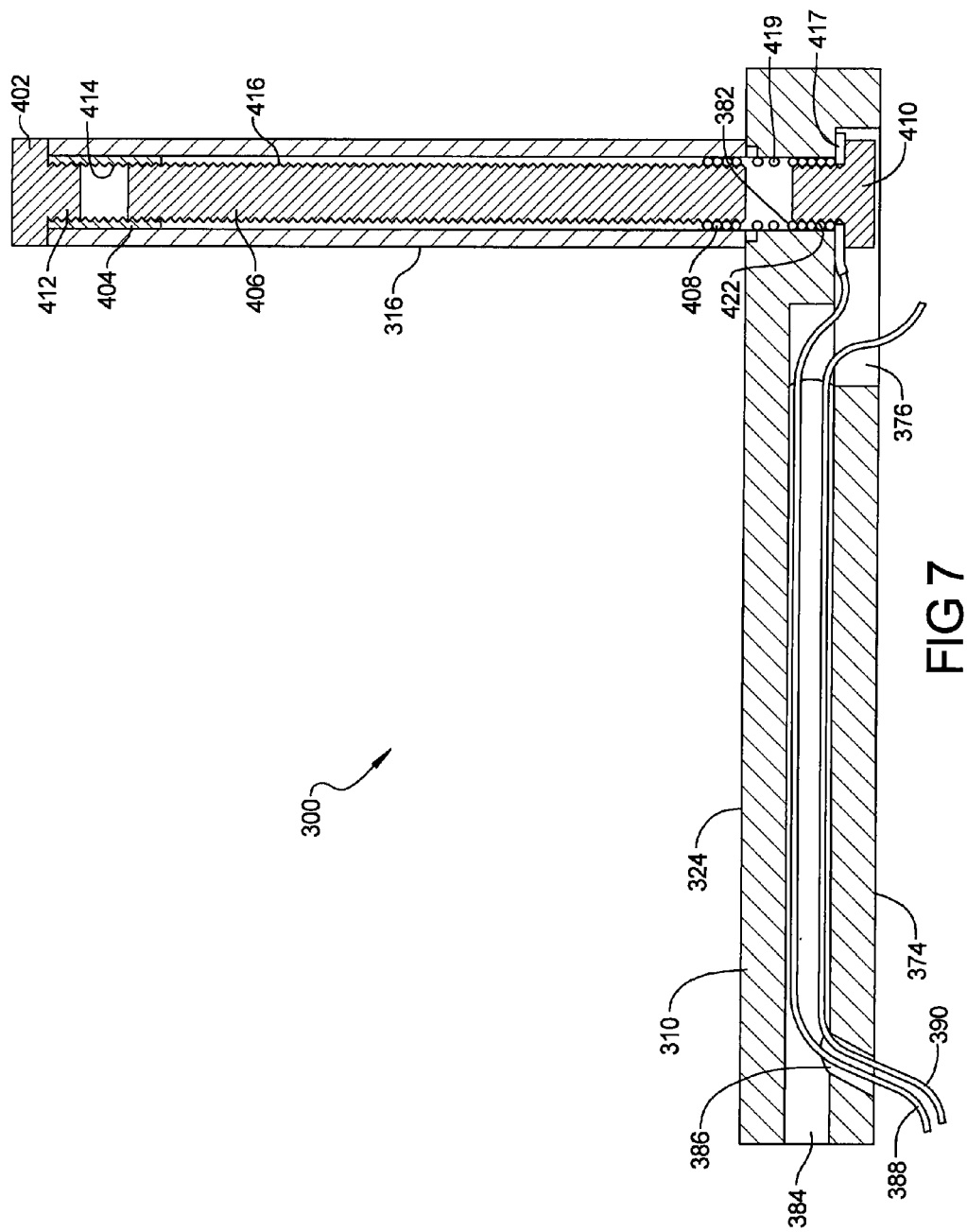
FIG. 7 is a cross-sectional view illustrating the first part taken along line 7-7 as shown in FIG. 3.
Figure 8:
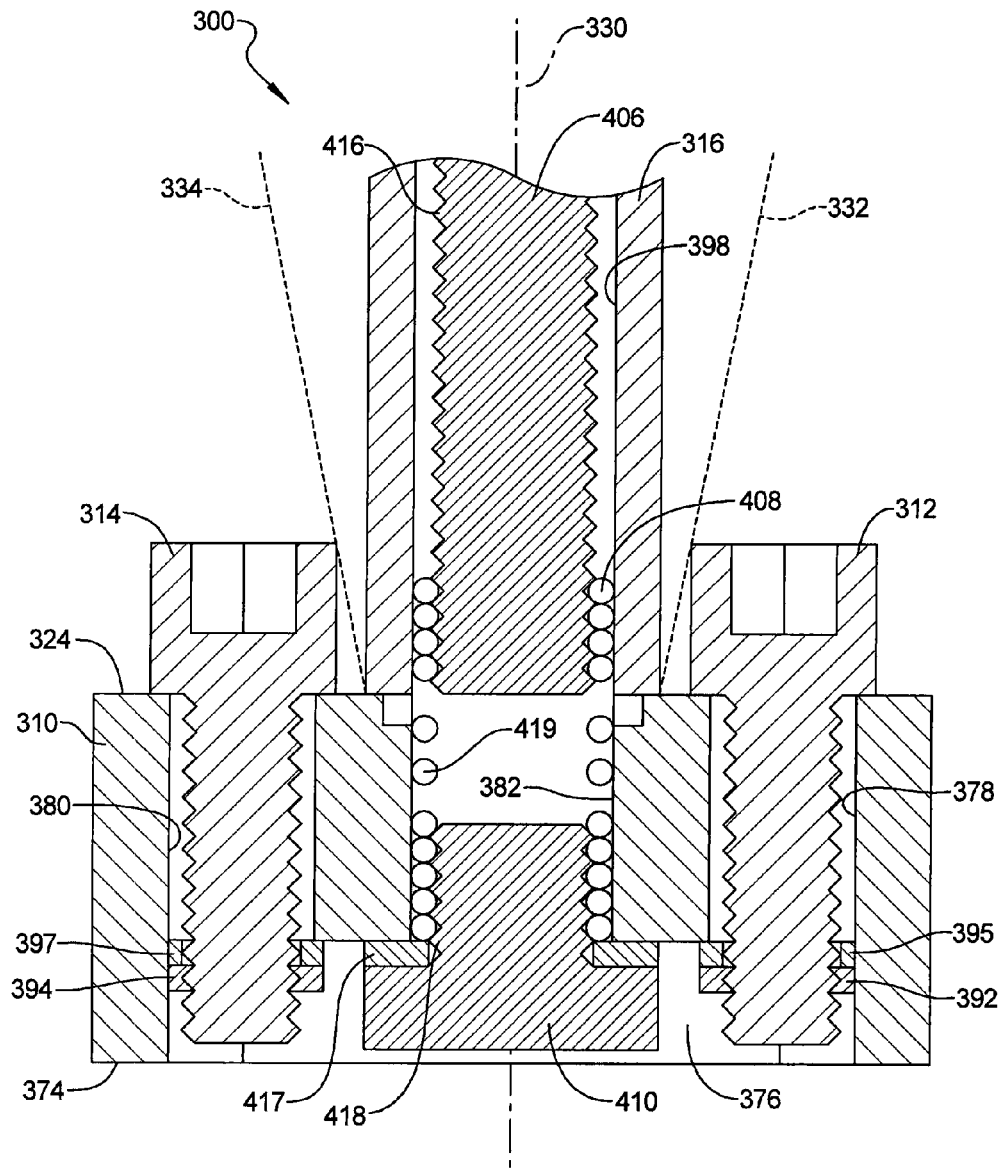
FIG. 8 is a fragmentary cross-sectional view illustrating the first part taken along line 8-8 as shown in FIG. 3.

FIGS. 6-8 illustrate a preferred embodiment of first part 300, alarm 304, mounting member 310, electrical contacts 312, 314, and post 316. In the preferred embodiment, first part 300 further includes an extension 356. Mounting member 310 is a generally flat, T-shaped member composed of a non-conductive polymeric material. Mounting member 310 includes flanges 360, 362 and a body 364 formed together as a single piece part. Flanges 360, 362 extend from body 364 in the transverse direction and include respective counter bores 366, 368. Counter bores 366, 368 receive and engage threaded fasteners 370, 372 for attaching mounting member 310 to side wall 232 of platform 216. Threaded fasteners 370, 372 are cap screws having a tapered shank designed to be driven into side wall 232 or into a pilot hole formed in side wall 232. In other embodiments, threaded fasteners 370, 372 have a non-tapered shank designed to thread into a threaded hole formed in side wall 232.

Body 364 includes top surface 324, a bottom surface 374, a cavity 376, apertures 378, 380, 382, and passages 384, 386. Cavity 376 is formed in bottom surface 374 and provides an area where various attachments and electrical connections forming the alarm circuit are made. Apertures 378, 380 extend through top surface 324 to cavity 376 substantially parallel to axis 330. Furthermore, apertures 378 and 380 receive electrical contacts 312 and 314, respectively. Aperture 382 extends through top surface 324 to cavity 376 substantially parallel to axis 330 and is disposed midway between apertures 378, 380 along axis 328. Passage 384 extends through body 364 along axis 322 from first end 320 to cavity 376. Passage 386 extends through bottom surface 374 to passage 384 at an angle. Passages 384, 386 are sized to allow wires 388, 390 of the alarm circuit to pass through mounting member 310 and connect to alarm 304.

Electrical contacts 312, 314 are formed by cap screws that extend through apertures 378, 380 and threadingly engage hex nuts 392, 394 to form an electrical connection with wiring leads 395, 397. Electrical contacts 312, 314 and hex nuts 392, 394 are made from electrically-conductive materials and, preferably, are made from zinc-plated steel. In a preferred form, hex nuts 392, 394 include a locking feature for securing the electrical connection and may be lock nuts or serrated face nuts.

Post 316 is an elongated hollow cylinder including a through bore 398 and is made from a conductive material, such as aluminum. Post 316 is secured to mounting member 300 via a biasing mechanism 400. Biasing mechanism 400 includes a threaded cap 402, a threaded coupling sleeve 404, a threaded rod 406, a coil spring 408, and a hex screw 410. Together, cap 402, coupling sleeve 404, rod 406, and hex screw 410 create a tensioning mechanism that tensions coil spring 408. Tension in coil spring 408 draws post 316 against top surface 324 and biases post 316 in the first position. Movement of post 316 away from the first position increases the tension in coil spring 408, creating a return force.

Cap 402 is received within bore 398 and abuts an upper end of post 316 at a head end. Cap 402 includes external threads 412 that threadingly engage coupling sleeve 404. In a preferred form, cap 402 is a thumb screw. Coupling sleeve 404 is slidably received within bore 398 and includes internal threads 414 that threadingly engage external threads 412 and rod 406. Rod 406 includes external threads 416 that threadingly engage internal threads 414 and threadingly engage coils of coil spring 408. Cap 402 is made from a non-conductive polymeric material. Additionally, coupling sleeve 404 and rod 406 are composed of a conductive material such as aluminum.

Coil spring 408 is slidably received within aperture 382 and bore 398. Coil spring 408 is a close-wound tension spring made from zinc-plated steel. In alternate embodiments, coil spring 408 is formed to have an initial tension at a free length. Coil spring 408 has a coil pitch that enables rod 406 and hex screw 410 to threadingly engage coils of coil spring 408. Hex screw 410 is received within aperture 382 and engages bottom surface 374 at a head end. Hex screw 410 receives an eyelet 417 connected to wire 388. Hex screw 410 includes external threads 418 that threadingly engage coils of coil spring 408. Hex screw 410 is made from zinc-plated steel.

Post 316 and biasing mechanism 400 are assembled in the following manner. The threaded shank of hex screw 410 is inserted through eyelet 417 and threaded into coils at a lower end of coil spring 408 until eyelet 417 is compressed against an end coil and tension is created in hex screw 410. Hex screw 410 and coil spring 408 are inserted together through aperture 382 and a lower end of rod 406 is threaded into coils at an upper end of coil spring 408. Post 316 is inserted over rod 406 until a lower end of post 316 abuts top surface 324.

Sleeve 404 is threaded on the threaded shank of cap 402 until sleeve 404 is compressed against the head of cap 402 and tension is created in cap 402. Cap 402 and sleeve 404 are inserted through an upper end of post 316 and cap 402 is rotated to thread sleeve 404 on an upper end of rod 406. Cap 402 is rotated until coil spring 408 is stretched and a desired tension is created in active coils 419 of coil spring 408. The tension in active coils 419 may be adjusted by rotating cap 402 and sleeve 404 to provide a desired biasing force.

Extension 356 is an elongated cylindrical member that is received on the upper end of post 316, and extends vertically from post 316 along axis 330. Extension 356 provides a visual cue to the driver as to the location of slot 242 of head member 202. Extension 356 can be placed on post 316 to provide the visual cue when hitching and unhitching trailer 112, and subsequently removed.

Alarm 304 is an audible alarm that produces sound at a level that alerts the driver of tow vehicle 110. In the preferred embodiment, alarm 304 includes a siren 420 supported within a housing 422. Siren 420 produces sound at around one hundred and twenty decibels (120 db) or more when powered by the alarm circuit. Siren 420 includes a first wire lead that is connected to leads 395, 397 via an electrical connector 424 and a second wire lead that is connected to wire 390 via an electrical connector 426. Electrical connectors 424, 426 are crimp-on connectors. In alternate embodiments, electrical connectors 424, 426 are plug and socket connectors, or other suitable electrical connectors. Housing 422 is attached to bottom surface 374 of mounting member 344 by tapered shank screws 428. Housing 422 surrounds cavity 376 and seals cavity along bottom surface 374.

Figure 9:
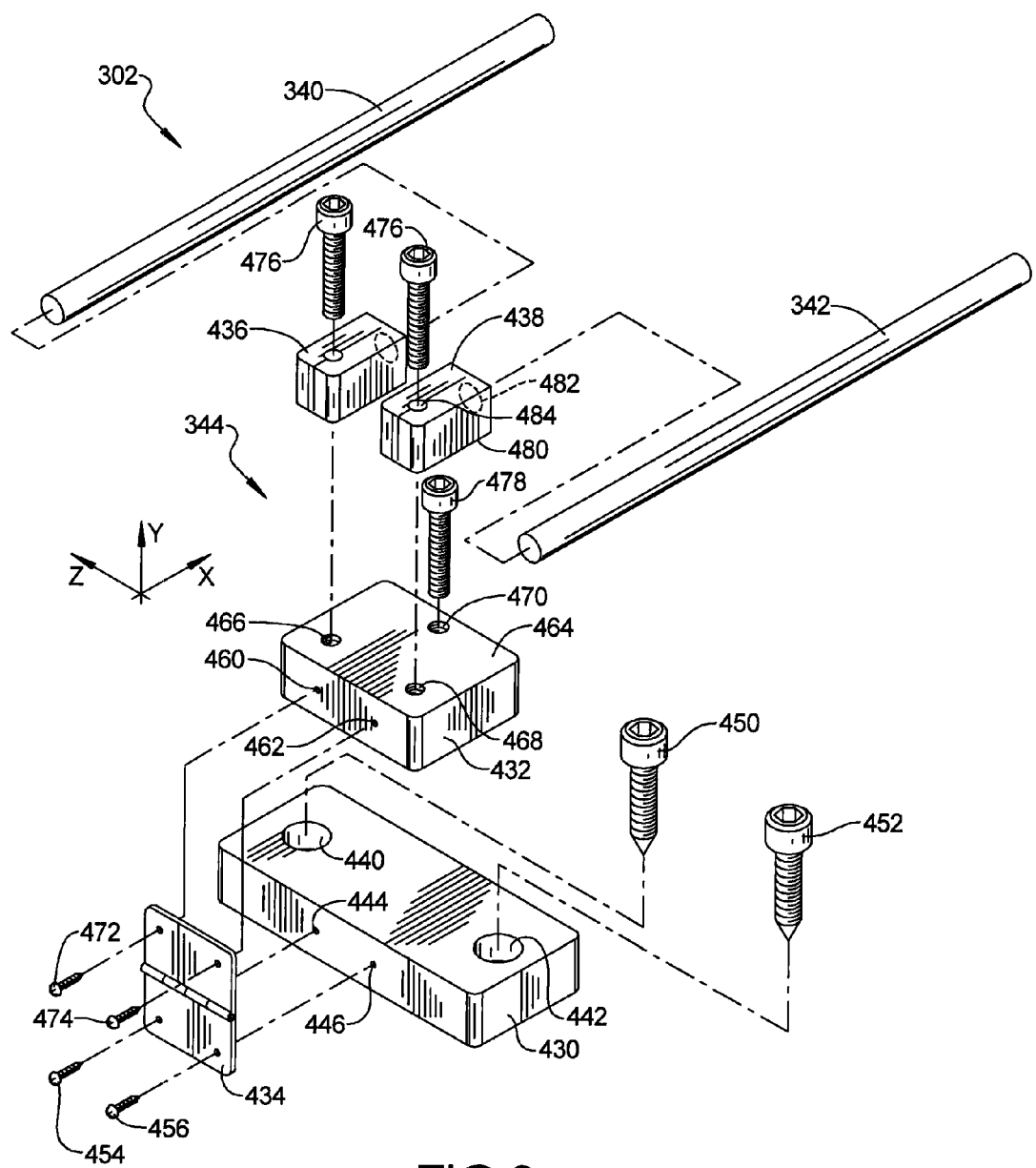
FIG. 9 is a partially exploded perspective view illustrating an exemplary second part of an alarm system according to the present teachings.

With particular reference to FIG. 9, a preferred embodiment of second part 302 is presented. Arms 340, 342 are elongate and cylindrical in shape, and made from aluminum. Although made from a conductive material in the preferred embodiment, arms 340, 342 may alternately be formed of a non-conductive material. Mounting member 344 includes a mounting block 430, a pivot block 432, a hinge 434, and shoulder blocks 436, 438. Mounting block 430 is configured to attach directly to sidewall 258 of extension box 252 and to support the remaining components of mounting member 344. Mounting block 430 includes counter bores 440, 442 and blind bores 444, 446. Counter bores 440, 442 extend through mounting block 430 from a top surface and receive threaded fasteners 450, 452 for attaching mounting block 430 to sidewall 258 of extension box 252. Blind bores 444, 446 are disposed on a rear surface and receive screws 454, 456 for attaching hinge 434 to the rear surface of mounting block 430.

Pivot block 432 establishes plane 350 within which arms 340, 342 extend and is pivotally attached to mounting block 430 via hinge 434. Pivot block 432 includes blind bores 460, 462, an upper surface 464, threaded bores 466, 468, and a threaded bore 470. Blind bores 460, 462 are disposed on a rear surface and receive screws 472, 474 for attaching hinge 434 to the rear surface of pivot block 432. Upper surface 464 is substantially flat and provides a mounting surface for shoulder blocks 436, 438. Threaded bores 466, 468 extend through upper surface 464 and receive cap screws 476 used to secure shoulder blocks 436, 438 to upper surface 464. Threaded bore 470 extends through upper surface 464 and receives an adjustment screw 478.

Shoulder blocks 436 and 438 receive and retain arms 340 and 342, respectively. Shoulder blocks 436 and 438 further retain arms 340 and 342 in a desired relationship with respect to each other and with respect to upper surface 464. Shoulder blocks 436, 438 are substantially identical. Thus, shoulder block 438 will be described with the understanding that the description applies equally to shoulder block 436.

Shoulder block 438 includes a bottom surface 480, a blind bore 482, and a through bore 484. Bottom surface 480 is substantially flat to complement upper surface 464. Blind bore 482 extends through a front face partially through shoulder block 438 parallel to bottom surface 480. Blind bore 482 is sized to receive arm 342 in a press fit. Through bore 484 extends through a top surface to bottom surface 480 substantially perpendicular to bottom surface 480. Through bore 484 is sized to slidably receive the shank of cap screw 476 and thereby serves as a pivot for adjusting an orientation of shoulder block 438 with respect to pivot block 432.

Shoulder block 438 is secured to pivot block 432 by inserting cap screw 476 through through bore 484 and threading cap screw 476 within threaded bore 468 until shoulder block 438 is compressed against upper surface 464 and tension is created in cap screw 476. To adjust the orientation of shoulder block 438, cap screw 476 is loosened and shoulder block 438 is rotated to a new desired position. In this way, angle 352 between arms 340, 344 is adjusted.

Hinge 434 is attached to the rear face of mounting block 430 and the rear face of pivot block 432 via screws 454, 456, 472, 474 and pivots about an axis that extends in the transverse direction (z-direction) with respect to trailer 112 when second part 302 is attached to extension box 252. In alternate embodiments, hinge 434 is a spring-loaded hinge including a torsion spring (not shown) that biases pivot block 432 and mounting block 430 into engagement. An angle 490 (FIG. 4) between mounting block 430 and pivot block 432 is set by threading adjustment screw 478 through the bore until adjustment screw 478 engages a top surface of mounting block 430 and moves pivot block 432 into a desired relationship (i.e., angle) with respect to mounting block 430.

Figure 10:
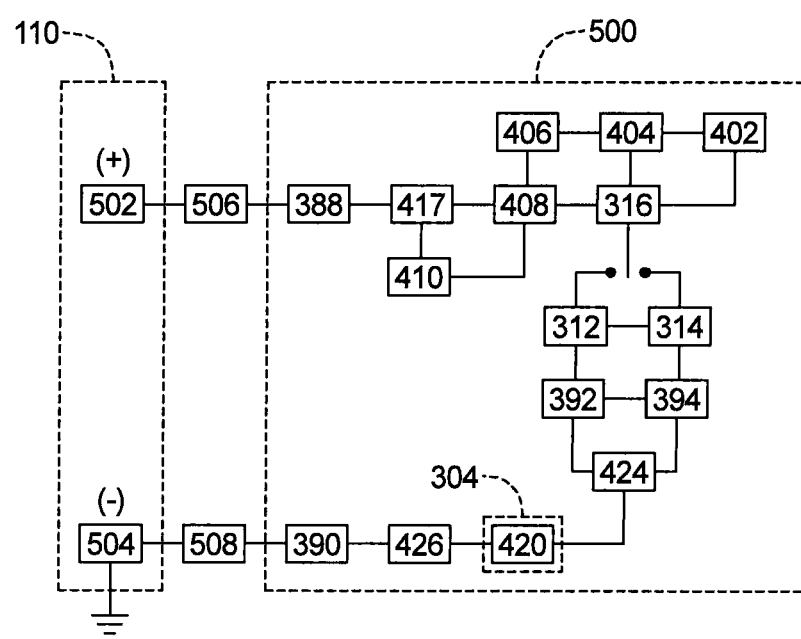
FIG. 10 is a block diagram illustrating an alarm circuit according to the present teachings.

With particular reference to FIG. 10, a functional block diagram illustrates an exemplary alarm circuit 500 for powering alarm 304 according to the present teachings. Generally, alarm circuit 500 is formed by the various components of alarm system 102, as discussed in further detail below, and is connected to a power circuit 502 and a ground circuit 504 of tow vehicle 110. Alarm circuit 500 is connected to power circuit 502 via an electrical connector 506, and is connected to ground circuit 504 via an electrical connector 508. Electrical connectors 506, 508 can be any suitable connectors such as crimp-on connectors and plug and socket connectors. In one example, connectors 506, 508 are integral with a single connector that plugs in to a trailering connector of tow vehicle 110.

In a preferred embodiment, alarm circuit 500 is powered only during periods when tow vehicle 110 is reversing. Accordingly, power circuit 502 is a circuit that supplies power when a transmission of tow vehicle 110 is in a reverse gear and discontinues power when tow vehicle 110 is in a forward drive gear, a neutral gear, and a park gear. In one example, power circuit 502 is a circuit that powers a reverse indicator light of tow vehicle 110. In other embodiments, alarm 304 is powered during periods when tow vehicle 110 is operated. In one example, power circuit 502 is an ignition circuit that supplies power when an ignition switch of tow vehicle 110 is in an on position. In the preferred embodiment, power is fed to post 316 and supplied from post 316 to alarm 304 via electrical contacts 312, 314. In alternate embodiments, power circuit 502 and ground circuit 504 are connected in a reverse manner, and power is fed to alarm 304.

Figure 11:
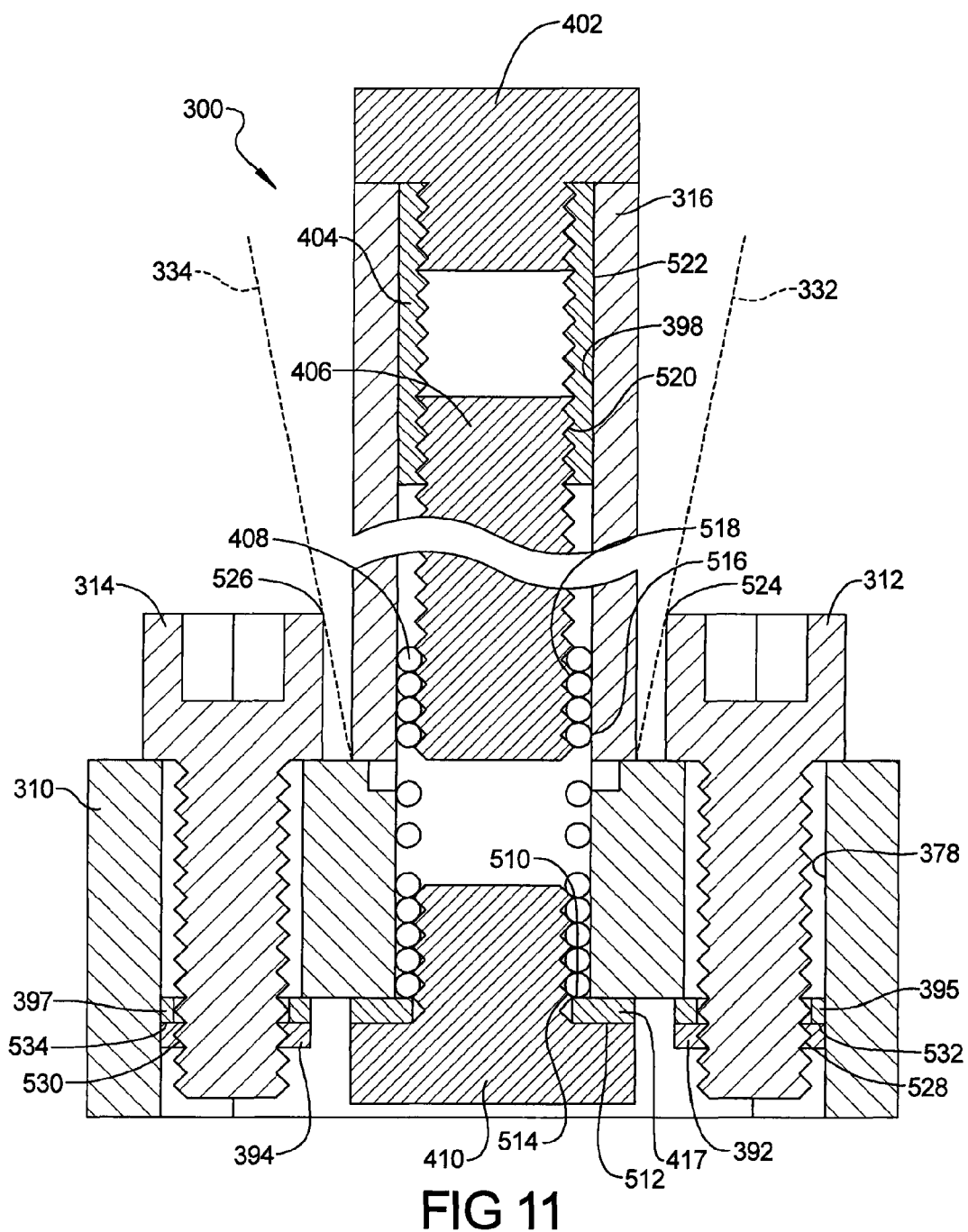
FIG. 11 is a fragmentary cross-sectional view illustrating the alarm circuit shown in FIG. 10 in further detail.

Alarm circuit 500 is formed by a series of electrical connections between various conductive components of alarm system 102. Alarm circuit 500 is open when post 316 is in the first position, and is closed (i.e., completed) when post 316 is in contact with electrical contacts 312, 314 in the second and third positions. Electrical connections between power circuit 502 and siren 420 are additionally shown in FIG. 11. In the preferred embodiment, power circuit 502 feeds power to post 316, which selectively transmits power to alarm 304. In other embodiments, power circuit 502 and ground circuit 504 are connected to alarm circuit 500 in an opposite manner, reversing the polarity.

Wire 388 is connected to power circuit 502 via electrical connector 506. Eyelet 417 is connected to wire 388 via a crimped connection. Eyelet 417 is connected to coil spring 408 through contact surfaces 510 between eyelet 417 and an end coil of coil spring 408. Eyelet 417 is further connected to coil spring 408 through contact surfaces 512 between eyelet 417 and hex screw 410 and contact surfaces 514 between threads 418 of hex screw 410 and coils at a lower end of coil spring 408. Coil spring 408 is connected to post 316 through contact surfaces 516 between coils at an upper end of coil spring 408 and post 316. Coil spring 408 is further connected to post 316 through contact surfaces 518, 520, 522. Contact surfaces 518 are contact surfaces between coils at an upper end of coil spring 408 and threads 416 of rod 406. Contact surfaces 520 are contact surfaces between threads 416 and threads 414 of sleeve 404. Contact surfaces 522 are contact surfaces between sleeve 404 and post 316.

Post 316 functions as a single pole, double throw switch that is connected to electrical contact 312 when in the second position by contact surfaces 524, and that is connected to electrical contact 314 when in the third position by contact surfaces 526. Electrical contacts 312, 314 are connected to wiring leads 395, 397 by contact surfaces 528, 530, and contact surfaces 532, 534, respectively. Contact surfaces 528, 530 are contact surfaces between the threads of electrical contacts 312, 314 and the threads of hex nuts 392, 394. Contact surfaces 532, 534 are contact surfaces between hex nuts 392, 394 and wiring leads 395, 397. Wiring leads 395, 397 are connected to siren 420 by electrical connector 424.

With particular reference to FIG. 10, electrical connections between ground circuit 504 and siren 420 will now be described in further detail. Wire 390 is connected to ground circuit 504 by electrical connector 508. Moreover, wire 390 is connected to siren 420 by electrical connector 426.

Operation of alarm system 102 is illustrated in FIGS. 12-13. As tow vehicle 110 is turned and rotates relative to trailer 112, arms 340, 342 move with respect to post 316. More specifically, arms 340, 342 rotate about an axis 600 defined by slot 242 of first hitch member 120 and coupling pin 256 of second hitch member 124. Arms 340, 342 rotate in a clockwise direction when tow vehicle 110 is progressively turned to the left with respect to trailer 112. Arms 340, 342 rotate in a counter clockwise direction when tow vehicle 110 is progressively turned right with respect to trailer 112. For simplicity, FIGS. 12-13 illustrate rotation of arms 340, 342 in a counter clockwise direction as indicated by the arrows.

Continued rotation of arm 342 in the counter clockwise direction causes arm 342 to engage post 316. Further rotation of arm 342 moves post 316 towards electrical contact 312 until post 316 contacts electrical contact 312 at the second position as shown in phantom. Similarly, rotation of arm 340 in a clockwise direction causes arm 340 to engage post 316. Continued rotation causes arm 340 to move post 316 towards electrical contact 314 until post 316 contacts electrical contact 314 at the third position.

The foregoing description of the embodiments has been provided for purposes of illustration and description. It is not intended to be exhaustive or to limit the disclosure. For example, the present alarm system can be employed for a semi-trailer attached to a tractor, or a boat trailer attached to a sport utility vehicle (SUV), and with a coupling other than a fifth wheel hitch, however, various advantages of the preferred system may not be realized. Individual elements or features of a particular embodiment are generally not limited to that particular embodiment but, where applicable, are interchangeable and can be used in a selected embodiment, even if not specifically shown or described. It is intended by the following claims to cover these and any other departures from the disclosed embodiments which fall within the true spirit of this invention.

What is claimed is:

1. An alarm system for an articulated vehicle, comprising:
 (a) a first part adapted to attach to a vehicular hitch member, the first part including: (i) a first electrical contact and a second electrical contact connected in parallel to an alarm circuit, the first and second electrical contacts being spaced apart in a first horizontal direction, and (ii) a conductive post disposed between the first and second electrical contacts and extending vertically, the post forming a part of the alarm circuit, the post being biased in a first position and moveable between the first position and a second position in which the post contacts the first electrical contact and completes the alarm circuit, and between the first position and a third position in which the post contacts the second electrical contact and completes the alarm circuit, the post including a conductive coil spring and a tensioning mechanism for tensioning the coil spring, wherein tension in the coil spring biases the post in the first position; and
 (b) a second part adapted to attach to a trailering hitch member, the second part including: (i) a first arm and a second arm independently coupled to the second part and extending in a second horizontal direction towards the post in a common plane at a first adjustable angle with respect to each other,
 wherein the first and second parts, when attached, are disposed so that the first arm moves the post from the first position to the second position as the articulated vehicle turns in a first direction, and so that the second arm moves the post from the first position to the third position as the articulated vehicle turns in a second direction opposite the first direction.

2. The alarm system of claim 1, wherein the first and second arms extend at a second angle with respect to a horizontal plane that is greater than zero degrees.

3. The alarm system of claim 2, wherein the second part is adapted to allow the second angle to be adjusted.

4. The alarm system of claim 1, wherein the second part is adapted to allow the first angle to be adjusted.

5. The alarm system of claim 1, wherein the first angle is less than ninety degrees.

6. The alarm system of claim 1, wherein the first part is adapted to attach to a vertical surface of the vehicular hitch member facing towards a front of the articulated vehicle.

7. The alarm system of claim 1, wherein the alarm circuit is powered by the articulated vehicle.

8. The alarm system of claim 1, wherein the second part is adapted to adjust an angle of the common plane with respect to a horizontal plane.

9. The alarm system of claim 1, wherein the second part is adapted to allow the first and second arms to rotate away from the post.

10. The alarm system of claim 1, wherein the vehicular hitch member and the trailering hitch member form parts of a fifth wheel hitch.

11. The alarm system of claim 1, further comprising a biasing mechanism that biases the post in the first position, and that forms a part of the alarm circuit.

12. The alarm system of claim 1, wherein the vehicular and trailering hitch members are adapted to attach to a passenger vehicle and a recreational vehicle, respectively.

13. An alarm system for an articulated vehicle, the alarm system comprising:
- (a) a post adapted to extend vertically from a first hitch member, the post being operable to open and close an alarm circuit, the post including a biasing mechanism to bias the post in a position to open the alarm circuit;
- (b) a mounting member adapted to attach to a second hitch member; and
- (c) a first arm and a second arm independently coupled to the mounting member and extending in a common plane towards the post at an adjustable angle with respect to each other, the first and second arms being disposed to engage the post to open and close the alarm circuit, wherein the mounting member is adapted to allow the first and second arms to move together between a first position in which the first and second arms extend towards the post and a second position in which the first and second arms extend away from the post.

14. The alarm system of claim 13, wherein the mounting member is adapted to allow the angle to be adjusted.

15. The alarm system of claim 13, wherein the angle is less than ninety degrees.

16. An alarm system for an articulated vehicle including a tow vehicle and a towed vehicle coupled by a fifth wheel hitch, the alarm system comprising:
- (a) a first part including: (i) a first mounting member adapted to attach to a vehicular hitch member at a first end and extend from the vehicular hitch member in a longitudinal direction with respect to the tow vehicle; (ii) a first electrical contact and a second electrical contact supported on the first mounting member at a second end opposite the first end and being spaced apart in a transverse direction with respect to the tow vehicle, the first and second electrical contacts being connected in parallel to an alarm circuit; (iii) a conductive post supported on the first mounting member between the first and second electrical contacts and extending vertically, the post forming part of the alarm circuit and including a longitudinally extending through bore; (iv) a housing mounted to a bottom surface of the first mounting member at the second end; and (v) an audible alarm disposed within the housing and being operatively connected to the alarm circuit;
- (b) a biasing mechanism that biases the post in a first position and allows the post to move between the first position and a second position in which the post contacts the first electrical contact and completes the alarm circuit, and between the first position and a third position in which the post contacts the second electrical contact and completes the alarm circuit, the biasing mechanism including: (i) a conductive coil spring coupled to the first mounting member and engaging the bore, the coil spring forming a part of the alarm circuit; and (ii) a tensioning mechanism extending through the bore and tensioning the coil spring, wherein tension in the coil spring provides a biasing force; and
- (c) a second part including: (i) a second mounting member adapted to attach to a trailering hitch member; and (ii) a first arm and a second arm independently and adjustably mounted on the second mounting member and extending in a common plane towards the post at a first adjustable angle with respect to each other less than one hundred and eighty degrees, wherein the first and second parts, when attached, are disposed so that the first arm moves the post from the first position to the second position as the tow vehicle turns in a first direction, and so that the second arm moves the post from the first position to the third position as the tow vehicle turns in a second direction opposite the first direction, wherein, when attached, the first mounting member extends from the vehicular hitch member towards a front of the tow vehicle, and the first and second arms extend from the trailering hitch member towards the front of the tow vehicle, wherein the first and second parts are spaced apart in a vertical direction when attached to the vehicular and trailering hitch members, and the first and second arms extend downward towards the post.

* * * * *